United States Patent
Johnson (10) Patent No.: US 8,715,374 B2
(45) Date of Patent: May 6, 2014

(54) METHODOLOGY OF POST-TRANSESTERIFICATION PROCESSING OF BIODIESEL RESULTING IN HIGH PURITY FAME FRACTIONS AND NEW FUELS

(75) Inventor: Duane Johnson, Bigfork, MT (US)

(73) Assignee: Green Fuels Research, Ltd., Cheltenham (GB)

(*) Notice: Subject to any disclaimer, the term of this patent is extended or adjusted under 35 U.S.C. 154(b) by 0 days.

(21) Appl. No.: 13/345,645

(22) Filed: Jan. 6, 2012

(65) Prior Publication Data

US 2012/0174473 A1 Jul. 12, 2012

Related U.S. Application Data

(60) Provisional application No. 61/430,424, filed on Jan. 6, 2011.

(51) Int. Cl.
 *C10L 1/19* (2006.01)
 *C10L 1/16* (2006.01)

(52) U.S. Cl.
 USPC .......... 44/388; 44/385; 44/437; 585/1; 585/14

(58) Field of Classification Search
 USPC ............ 554/163, 168, 211; 44/385, 388, 437; 585/1, 14
 See application file for complete search history.

(56) References Cited

U.S. PATENT DOCUMENTS

| | | | |
|---|---|---|---|
| 2,619,421 A | 11/1952 | Greenfield | |
| 4,129,583 A | 12/1978 | Zondek | |
| 4,228,089 A | 10/1980 | Bischof et al. | |
| 4,507,244 A | 3/1985 | Von Rappard et al. | |
| 2007/0175091 A1 | 8/2007 | Danzer et al. | |
| 2007/0214712 A1 | 9/2007 | Garwood et al. | |
| 2007/0277432 A1 | 12/2007 | Jackam et al. | |
| 2009/0183420 A1 | 7/2009 | Cobb | |
| 2009/0199462 A1 | 8/2009 | Bist et al. | |
| 2009/0305942 A1 | 12/2009 | Day et al. | |
| 2010/0170144 A1 | 7/2010 | Day et al. | |
| 2011/0138679 A1 | 6/2011 | Wells et al. | |
| 2011/0219676 A1 | 9/2011 | Koyama et al. | |
| 2012/0011765 A1* | 1/2012 | Dubois | 44/384 |
| 2012/0137574 A1* | 6/2012 | Stephen et al. | 44/388 |

FOREIGN PATENT DOCUMENTS

FR 2942804 A1 * 9/2010

OTHER PUBLICATIONS

"Designer" Biodiesel: Optimizing Fatty Ester Composition to Improve Fuel Properties by Gerhard Knothe Energy & Fuels (2008) 22, 1358-1364.*
IP Austrialia PCT ISO PCT/US2012/020562, (2012 publication month unknown).
Aug. 8, 2012 IP Austrialia PCT IRO PCT/US2012/020562.

* cited by examiner

*Primary Examiner* — Pamela H Weiss
(74) *Attorney, Agent, or Firm* — John D. Long, Esq.; Long & Chybik (57) ABSTRACT

A methodology for separation and subsequent handling of FAME fractions of biodiesel, comprising of the steps, providing a biodiesel containing several different FAME fractions mixed together, the biodiesel being at a first temperature wherein at the first temperature none of the FAME fractions of the biodiesel have crystallized; bringing the biodiesel to a first crystallizing temperature, wherein when the biodiesel reaches the first crystallizing temperature, a first FAME fraction remains in a non-crystallized, liquid phase while the remaining FAME fractions crystallize; and separating the liquid first FAME fraction from the remaining crystallized FAME fractions.

3 Claims, 11 Drawing Sheets

FIGURE 2

| Feedstock | C8:0 Saturated | C10:0 Saturated | C12:0 Saturated | C14:0 Saturated | C15:0 Saturated | C16:0 Saturated | C16:1 Omega 9 | C17:0 Saturated | C17:1 Omega 9 | C18:0 Saturated | C18:1 Omega 9 | C18:2 Omega 6 | C18:3 Omega 3 | C20:0 Saturated | C20:1 Omega 9 | C20:2 Omega 6 | C22:0 Saturated | C22:1 Omega 9 | C24:0 Saturated | C24:1 Omega 9 |
|---|---|---|---|---|---|---|---|---|---|---|---|---|---|---|---|---|---|---|---|---|
| Beef Tallow | | | 0.2 | 2.9 | 0.6 | 24.3 | 2.1 | 1.2 | 0.4 | 22.8 | 40.2 | 3.3 | 0.7 | 0.2 | 0.6 | | | | | |
| Camelina Oil | | | | | | 5.0 | | | | 2.2 | 17.7 | 18.0 | 37.9 | 1.4 | 9.8 | 1.6 | 0.4 | 4.5 | 0.3 | 0.2 |
| Canola Oil | | | | | | 3.6 | 0.3 | | | 1.9 | 63.9 | 19.0 | 9.7 | 0.6 | | | 0.4 | | 0.2 | 0.2 |
| Coconut | 6.3 | 6.0 | 49.2 | 18.5 | | 9.1 | | | | 2.7 | 6.5 | 1.7 | | | | | | | | |
| Corn | | | | | | 12.1 | 0.1 | | 0.1 | 1.8 | 27.2 | 56.2 | 1.3 | 0.4 | | | 0.2 | | | |
| Jatropha | | | | | | 12.7 | 0.7 | | | 5.5 | 39.1 | 41.6 | 0.2 | 0.2 | | | | | | |
| Palm | | | 0.2 | 0.5 | | 43.4 | 0.1 | | | 4.6 | 41.9 | 8.6 | 0.3 | 0.3 | | | 0.1 | | | |
| Soybean | | | | | | 9.4 | | | | 4.1 | 22.0 | 55.3 | 8.9 | | | | 0.3 | | | |
| Sunflower | | | | | | 4.2 | | | | 3.3 | 63.6 | 27.6 | 0.2 | | | | 0.7 | | 0.4 | |
| Used Cooking Oil | | | 0.1 | 0.1 | | 11.8 | 0.4 | 0.1 | 0.1 | 4.4 | 25.3 | 49.5 | 7.1 | 0.3 | | | 0.4 | 0.3 | 0.1 | |

| Description | Similar to: | C8 | C9 FAME | C9 | C10 FAME | C10 | C11 FAME | C11 | C12 | C12 FAME | C13 FAME | C15 FAME | C17 FAME | C19 FAME | C21 FAME | C23 FAME | C25 FAME |
|---|---|---|---|---|---|---|---|---|---|---|---|---|---|---|---|---|---|
| | | Compositon of New Fuels (% by volume), if Camelina oil was the original biodiesel feedstock | | | | | | | | | | | | | | | |
| New Fuel (Item 7) | Jet A | 1 | 1 | 31 | 31 | 6 | 6 | 4 | 0 | 0.5 | 0.1 | 0.5 | 10 | 4 | 2 | 1 | 1 |
| 2nd New Fuel (Item 8) | Jet A-1 | 1 | 1 | 28 | 28 | 20 | 20 | 0 | 1 | 0 | 1 | 0 | 0 | 0 | 0 | 0 | 0 |

Note: see Figure 1 for process location of New Fuel and 2nd New Fuel.

Figure 9 - Composition of New Fuels (Items 7 and 8 in Figure 1)
(Composition of Fuels Shown to the nearest one decimal place)

Initial Specification Testing of New Fuel (Item 7)

| Specific Test   ASTM | JP-8 Average | Jet A/A-1 | New Fuel Item 7 |
|---|---|---|---|
| Aromatics (Vol%) D1319 | 25 | 25 | 10 |
| Flash Point (C) D56 | 38 | 38 | 51 |
| Density @15C (km/m$^3$) D1298 | 775-840 | 775-804 | 805 |
| Net Heat of Combustion (MJ/kg) D3338 | 42.8 | 42.8 | 43.3 |
| Copper Strip (2h@100C) D130 | 1 | 1 | 1.2 |
| Freeze Point (C) D2386 | -47 | -40 to -47 | -54 |

Figure 10 - Characteristics of New Fuel (item 7) vs. Existing Jet Fuels

Pour Point of Free Fatty Acids
*are Omega 3 fatty Acids

| Systematic name | Trivial name | Shorthand designation | Molecular wt. | MP°C |
|---|---|---|---|---|
| 9,12-octadecadienoic | linoleic | 18:2(n-6) | 280.4 | -5 |
| 6,9,12-octadecatrienoic | g-linolenic | 18:3(n-6) | 278.4 | |
| 8,11,14-eicosatrienoic | dihomo-g-linolenic | 20:3(n-6) | 306.5 | |
| 5,8,11,14-eicosatetraenoic | arachidonic | 20:4(n-6) | 304.5 | -50 |
| 7,10,13,16-docosatetraenoic | - | 22:4(n-6) | 332.6 | |
| 4,7,10,13,16-docosapentaenoic | - | 22:5(n-6) | 330.6 | |
| 9,12,15-octadecatrienoic | a-linolenic | 18:3(n-3)* | 278.4 | -11 |
| 6,9,12,15-octadecatetraenoic | stearidonic | 18:4(n-3)* | 276.4 | -57 |
| 8,11,14,17-eicosatetraenoic | - | 20:4(n-3)* | 304.5 | |
| 5,8,11,14,17-eicosapentaenoic | EPA | 20:5(n-3)* | 302.5 | -54 |
| 7,10,13,16,19-docosapentaenoic | DPA | 22:5(n-3)* | 330.6 | |
| 4,7,10,13,16,19-docosahexaenoic | DHA | 22:6(n-3)* | 328.6 | -44 |
| 6,9,12,15,18,21-tetracosenoic | nisinic | 24:6(n-3)* | 356.6 | |
| 5,8,11-eicosatrienoic | Mead acid | 20:3(n-9) | 306.5 | |

Figure 11 – Pour Point of Free Fatty Acids

METHODOLOGY OF POST-TRANSESTERIFICATION PROCESSING OF BIODIESEL RESULTING IN HIGH PURITY FAME FRACTIONS AND NEW FUELS

CROSS-REFERENCES TO RELATED APPLICATIONS

This application claims the benefit under 35 U.S.C. §119 (e) of U.S. Provisional Patent Application No. 61/430,424, filed on Jan. 6, 2011, contents of which are relied upon and incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to various methodologies for the post-transesterification processing of biodiesel to obtain high purity fatty acid methyl ester (FAME) compounds. More particularly, the present invention may relate to those methodologies whose biodiesel fractionalization may use one or more crystallization-separation stages to generally obtain high purity, high yield FAME fractions, as well as utilizing the obtained FAME fractions to form new compositions.

BACKGROUND

Biodiesel may be used as an alternative fuel or an additive for combining with petroleum or fossil-based liquid fuels. A typical use of biodiesel may be the replacement of or blending into Diesel #2, which itself is a crude mineral oil refining process distillate. Diesel #2 may generally be used as fuel in internal combustion power plants used in vehicles, power generation equipment, and the like. Biodiesel may be seen as a renewable, biodegradable, sustainable fuel (e.g., being obtained from replenishable sources such as oil seed crops and the like) that produces 85% less greenhouse gas emissions in comparison to non-renewable, generally non-biodegradable, petroleum-based Diesel #2 usage. Similarly, biodiesel may be further refined via hydrocracking to produce short-chain fatty acids and esters for use in turbine fuels.

To create biodiesel, generally a raw, renewable, source of fatty acids may be used as a feedstock (e.g., such as seed oil that is refined from crushing of seeds). As substantially shown in FIG. 2, the biodiesel feedstock is a triglyceride (namely a glycerin molecule with 3 fatty acid carbon chains [generally of variable lengths] attached to it.) Transesterification means, known to those who have skill in the art, to react the triglyceride feedstock with an alcohol [e.g., methanol, ethanol, etc] in the presence of the base catalyst such as sodium hydroxide (NaOH) potassium hydroxide (KOH) or sodium methylate (NaOCH3). The alcohol reacts with the fatty acids to form the mono-alkyl esters (or biodiesel) and crude glycerin (a/k/a glycerine, glycerol). The mixture of mono-alkyl esters (or Fatty Acid Methyl Esters, also known by the acronym F.A.M.E. or FAME or other similar alkyl esters) and crude glycerin may then be substantially separated into a biodiesel (e.g., various FAME or mono-alkyl esters fractions) portion and a glycerin portion. The separated out portion of the various FAME fractions then generally undergoes a product purification to bring the FAME/biodiesel portion to desired industry standards for use as fuel (such as ASTM D6751 and the like).

Some of the issues relating to such biodiesel performance are generally a function of its feedstock's fatty acid profile. For example, biodiesel fuel made from Coconut oil has a very high Cloud Point and Gel Point in comparison to other biodiesel made from other feedstocks because it is primarily composed of saturated fatty acid esters. These physical characteristics may cause the biodiesel made from coconut oil feedstock to undergo a partial phase change at above acceptable temperatures leading to higher viscosity and crystallization, interfering with its use in engines, and possibly requiring the introduction of expensive gel point lowering additives into the resultant biodiesel.

Some feedstocks have high amounts of saturated fatty acids present giving their resulting biodiesel fuels improved oxidative stability, making the biodiesels less likely to require oxidative stabilization additives. Such resulting biodiesel fuels are suitable in more tropical climates. Biodiesel fuel manufactured from oils such as flax have a very different effect on biodiesel functionality. Flax oil, for example, is very high in highly unsaturated fatty acids (HUFA). Biodiesels made from such fatty acids have very low operating temperatures and can work under relatively cold conditions but are oxidatively unstable over time and in high heat conditions making them unsuitable for fuel use without excessive fuel stabilizers.

What is needed therefore is a high volume, separation process or methodology that not only isolates, refines and removes from the biodiesel, the various FAME fractions in high purity that are commercially desirable compounds apart from their original fuel usage but also allows such purified fractions to be further treated and combined to form new fuels (e.g., aviation fuel) having better fuel characteristics than the original mixed fraction biodiesel from transesterification. Such FAME fractions could include Omega 3 polyunsaturated FAME, mono unsaturated FAME, and saturated FAME.

The high purity Omega 3 polyunsaturated FAME fraction could have further demand in the cosmetic and neutraceutical industry. The Omega 3 (typically alpha-linolenic acid [ALA]) FAME fractions may be classified as a member of the essential fatty acid group, so called because they cannot be produced within the human body and must be acquired through diet. Omega 3 FAME is shown to reduce serum cholesterol and is used in the neutraceutical industry in dietary supplements. Omega 3 FAME also may be highly sought out by the cosmetics industry as binders, as they are close in composition to skin oils.

The saturated and unsaturated FAME fractions may be used to provide a biodiesel with performance characteristics for a multitude of weather conditions, as well as be an additive for an aviation fuel, lubricant, or biodiesel blend, and heating oils. Unsaturated FAME such as monounsaturated fatty acids (i.e., MUFA or omega 9) and polyunsaturated fatty acids (i.e., PUFA or omega 6) are typical of standards used by the European Union and North American FAMEs found in such a biodiesel feedstock per ASTM D6751 biodiesel test protocols. The Omega 6 and Omega 9 FAME components found in the biodiesel may be more likely to undergo oxidation generating the presence of epoxies and ketones in the biodiesel. The presence of these epoxies and ketones could require the use of stabilization additives in the biodiesel to allow it to function properly in its intended use. The saturated FAME, having a high cloud point and the omega 3 (HUFA) generally having a poor oxidative stability are typically minimized to pass ASTM D6751 biodiesel fuel specifications.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide means of high purity fractionalization of biodiesel to provide FAME fractions having high commercial value outside of their original fuel usage;

provide crystallization and high purity separation of various FAME fractions of biodiesel; and the ability to further process various FAME fractions into collections of uniform lengths of hydrocarbon chains, and lengths of hydrocarbon chains with an alcohol group attached that can be used to create new fuel compositions;

These and other advantages may be realized by reference to the remaining portions of the specification, claims, and abstract.

Brief Description of One Embodiment of the Present Invention

One possible embodiment of the invention could be a methodology for separation and subsequent processing of FAME fractions of a biodiesel, comprising of the steps: providing a biodiesel containing several different FAME fractions mixed together, the biodiesel being at a first temperature wherein at the first temperature none of the FAME fractions of the biodiesel have crystallized; bringing the biodiesel to a first crystallizing temperature, wherein when the biodiesel reaches the first crystallizing temperature, a first FAME fraction remains in a non-crystallized, liquid phase while the remaining FAME fractions crystallize; and separating the liquid first FAME fraction from the remaining crystallized FAME fractions.

Another possible embodiment of the invention could be methodology for separating and subsequently processing of FAME fractions of biodiesel, comprising of the steps, providing a biodiesel that is a mixture containing at least several different FAME fractions, the biodiesel being at a first temperature wherein at the first temperature none of the FAME fractions of the biodiesel are crystallized; cooling the biodiesel from the first temperature to a first crystallization temperature, wherein a first FAME fraction is a liquid phase while the remaining FAME fractions are crystallized, allowing the first FAME fraction to be separated from the remaining crystallized FAME fractions; bringing the temperature of the remaining FAME fractions to a second crystallization temperature in which a second FAME fraction is crystallized while a third FAME fraction is in a liquid phase to allow the third FAME fraction to be separated from the second FAME fraction, wherein the first FAME fraction is Omega 3 FAME fraction, a second FAME fraction contains saturated FAME while third FAME fraction comprises of Omega 6 FAME and Omega 9 FAME.

Another possible embodiment of the invention could be a methodology for separating and subsequently processing of FAME fractions of biodiesel, comprising of the steps, providing a biodiesel that is a mixture containing at least several different FAME fractions, the biodiesel being at a first temperature wherein at the first temperature none of the FAME fractions of the biodiesel have crystallized; cooling the biodiesel from the first temperature to a first crystallization temperature, wherein a first FAME fraction is a liquid phase while the remaining FAME fractions are crystallized, allowing the first FAME fraction to be separated from the remaining crystallized FAME fractions, wherein the first FAME fraction is Omega 3 FAME fraction; subjecting the first FAME fraction to glycerolysis to form Alpha-Linolenic Acid.

Another possible embodiment of the invention could be a methodology for separating and subsequently processing of FAME fractions of biodiesel, comprising of the steps, providing a biodiesel; sequentially cooling and heating of a biodiesel to provide for the repeated FAME fraction crystallization and subsequent separation of a first, second, and third FAME fractions of the biodiesel, wherein the first FAME fraction is an Omega 3 fraction, the second FAME fraction is saturated FAME fraction, and the third FAME fraction comprises of Omega 6 FAME and Omega 9 FAME; subjecting the third FAME fraction to hydrogenation to produce a mono unsaturated FAME; and performing hydrolysis of the mono-unsaturated FAME to create a first aviation jet fuel composition.

Another possible embodiment of the invention could be a methodology for separating and subsequently processing of FAME fractions of biodiesel, comprising of the steps, providing a biodiesel; sequentially cooling and heating of a biodiesel to provide for the repeated FAME fraction crystallization and subsequent separation of a first, second, third and fourth FAME fractions of the biodiesel, wherein the first FAME fraction is an Omega 3 fraction, a second FAME fraction having saturated FAME, and a third FAME fraction having Omega 6 FAME and Omega 9 FAME; subjecting the third FAME fraction to hydrogenation to produce a mono unsaturated FAME; performing hydrolysis of the Mono-unsaturated FAME to create a first aviation jet fuel composition; and adding the second FAME fraction to first aviation jet fuel composition to create a second aviation jet fuel composition.

Another possible embodiment of the invention could be a jet aviation fuel composition comprising percentage by volume: 1% C8; 1% C9 FAME; 31% C9; 31% C10 FAME; 6% C10; 6% C11 FAME; 4% C11; 0.5% C12 FAME; 0.1% C13 FAME; 0.5% C15 FAME; 10% C17 FAME; 4% C19 FAME; 2% C21 FAME; 1% C23 FAME; and 1% C25 FAME.

Another possible embodiment of the invention could be a jet aviation fuel composition comprising percentage by volume of 1% C8, 1% C9 FAME, 28% C9, 28% C10 FAME, 20% C10, 20% C11 FAME, 1% C12, and 1% C13 FAME.

The above description sets forth, rather broadly, a summary of at least one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
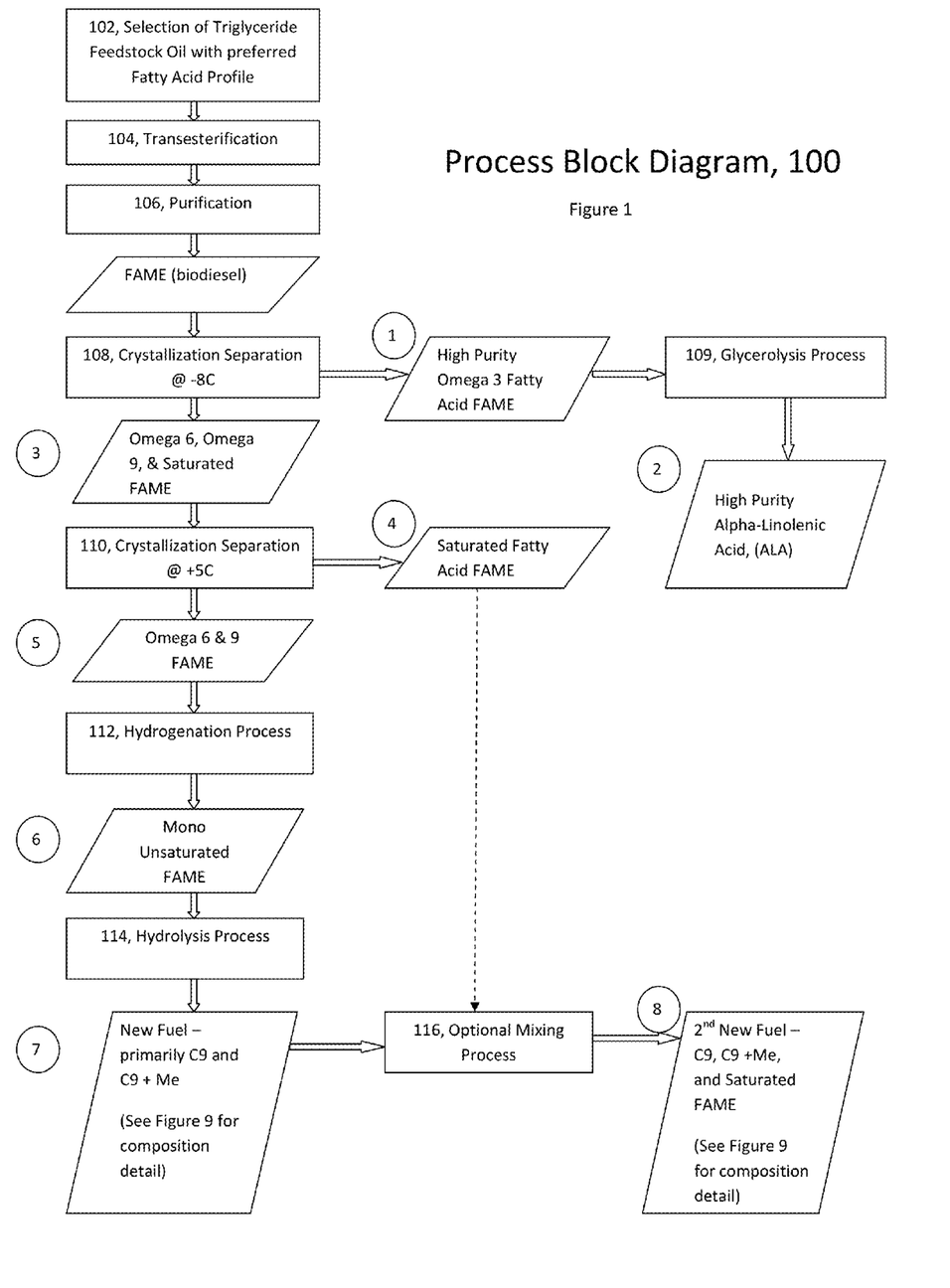
FIG. 1 is substantially a process block diagram of one methodology embodiment of the present invention.

As substantially shown in FIG. 1, process block diagram, the present invention 10 could comprise of a 100 methodology of post-transesterification high purity extraction from a biodiesel utilizing crystallization separation processes to generally obtain resultant high purity yields of various desired FAME fractions. These fractions are identified as FAME fractions and new fuels as process resultants 1 through 8 in FIG. 1. The process 100 could start with step 102, selection of the biodiesel feedstock having a preferred fatty acid profile. In selecting of a feedstock for initial biodiesel that will be further processed by the invention, the operator could look for that feedstock whose triglyceride molecules have a fatty acid profile high in those components that the operator wishes to obtain in high purity high yield fractions for their own commercial use or to be used as fuel additives or fuel base for the formulation of new fuels and the like.

Figure 2:
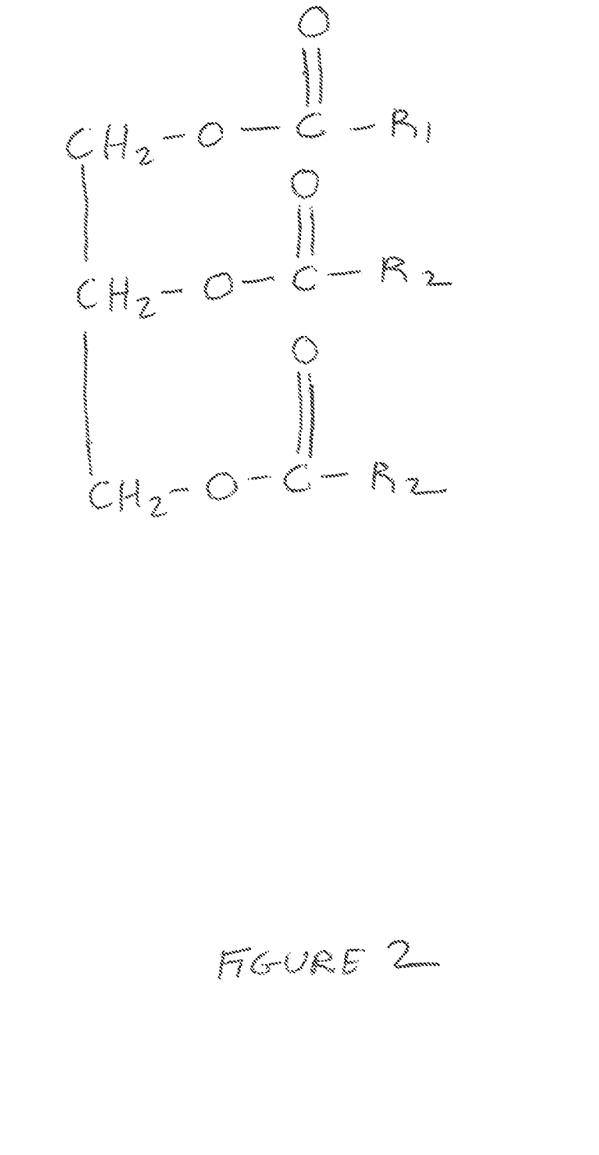
FIG. 2 is substantially a structural formula triglyceride molecule.

As substantially shown in FIG. 2, the chemical structural formulae for a triglyceride molecule (e.g., the basic biodiesel feed stock) wherein R1, R2, and R3 generally represent the hydrocarbon chains of the fatty acid (or acyl) groups that help form a particular triglyceride. Generally, each R represents a hydrocarbon chain of eight (8) to twenty-four (24) carbon atoms, but the lengths of R1, R2, and R3 are not necessarily equal.

Figure 3:
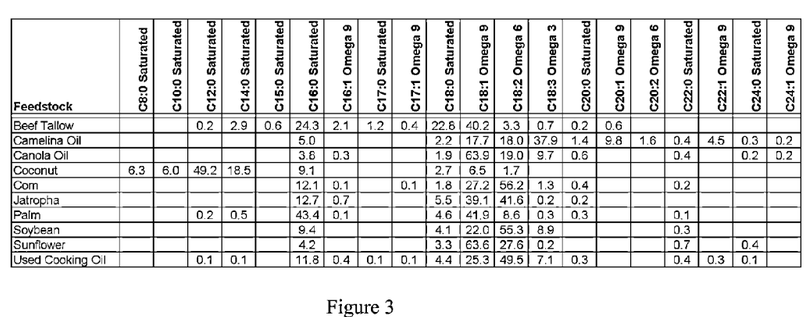
FIG. 3 is substantially a chart of a selection of some of potential feedstock for the manufacture and refinement of biodiesel as used in the present invention.

FIG. 3 substantially shows a Fatty Acid Profile Chart that generally shows the percentage of fatty acids and their carbon chain length (via the triglyceride molecule) that may be associated with some oils as set forth in the "Feedstock" column that may be used as biodiesel feed stock. This table should be only considered to be merely exemplary and not all to an inclusive listing of potential feedstock for biodiesel production (other biodiesel feedstocks being organic waste oils, algae-based products, and the like.) At the top of the chart, the number after the "C" is the length of the carbon chain. The number after the semicolon is the number of double bonds in the carbon chain. In these regards, those fatty acids whose chains that lack double bonds are generally considered "saturated" fatty acids (all of their bonds being single bonds.) Those fatty acid chains with only one double bond or an "unsaturated" bond are generally considered "mono unsaturated" fatty acids (e.g., one such a nine [9]carbon fatty acid chain with a single double bond is known as Omega 9 fatty acid or MUFA). The fatty acids whose hydrocarbon chains have multiple double bonds are generally marked as "polyunsaturated" fatty acids or PUFA. Such examples of these "polyunsaturated" fatty acids could be the Omega 6 fatty acids (i.e., a hydrocarbon chain unsaturated at position 6 distal to carboxyl group) and Omega 3 fatty acid (i.e., a hydrocarbon chain unsaturated at position 3 distal to the carboxyl group). One such Omega 3 polyunsaturated fatty acid chain is the C18:3, which is also known as Alpha Linolenic Acid (or ALA).

By selecting the appropriate feedstock, the resulting FAME or biodiesel could have a Fatty Acid profile significantly different from the original feedstock triglyceride (except that the resultant FAME includes an Alcohol bonded in lieu of the glycerine backbone as part of the transesterification process). As noted above, the Biodiesel (generally composed of multiple FAME fractions) can be made from any oil or fat on the list (as well as many other feedstocks not shown on the lists). In this manner, because the invention 10 can be used to isolate one or more specific FAME fractions, the operator could reference the list to select an oil feedstock that contains relatively high amounts of certain Fatty Acid(s) that could give rise through the invention of corresponding specific and desired, high yield, high purity FAME fraction(s). As an example, Camelina oil is generally very high in the C18:3n3 (Omega 3) fatty acid (e.g., for clarification of the nomenclature, the "C18" denotes that the fatty acid has a carbon chain of 18 carbons while the "3" denotes three double bonds on the chain.) The n3 denotes this is an Omega 3 with the double bond at the third position distal to the carboxyl group and therefore could be considered a very good seed oil feedstock to form a biodiesel from which the invention 10 could subsequently refine and isolate Omega 3 FAME fraction.

As described, below the invention 10 could also refine and purify from biodiesel the Omega 6 FAME and Omega 9 FAME (as well as other FAME fractions) and then substantially further process those FAME fractions into a new fuel that could have an optimal use as an aviation fuel. In this case, Jatropha, Canola, Safflower, Sunflower and Soy oils could be very good feedstock choices to generally optimize this portion of the invention 10 because each these feed stock choices has a high combined sum of primarily C18:1n9 fatty acids (e.g., forming resultant Omega 9 FAME-having 18 carbon chain with one double bond in the carbon chain at the nine (9) carbon position) and C18:2n6 fatty acids (e.g., forming resultant Omega 6 FAME-having 2 double bonds in the hydrocarbon chain at the nine [9] position and at the six [6] position of distal end).

Once the feedstock selection for the biodiesel has been made and the appropriate type of and amount of feed stock has been procured for processing, the process 100 then could proceed to step 104, transesterification.

Figure 4:
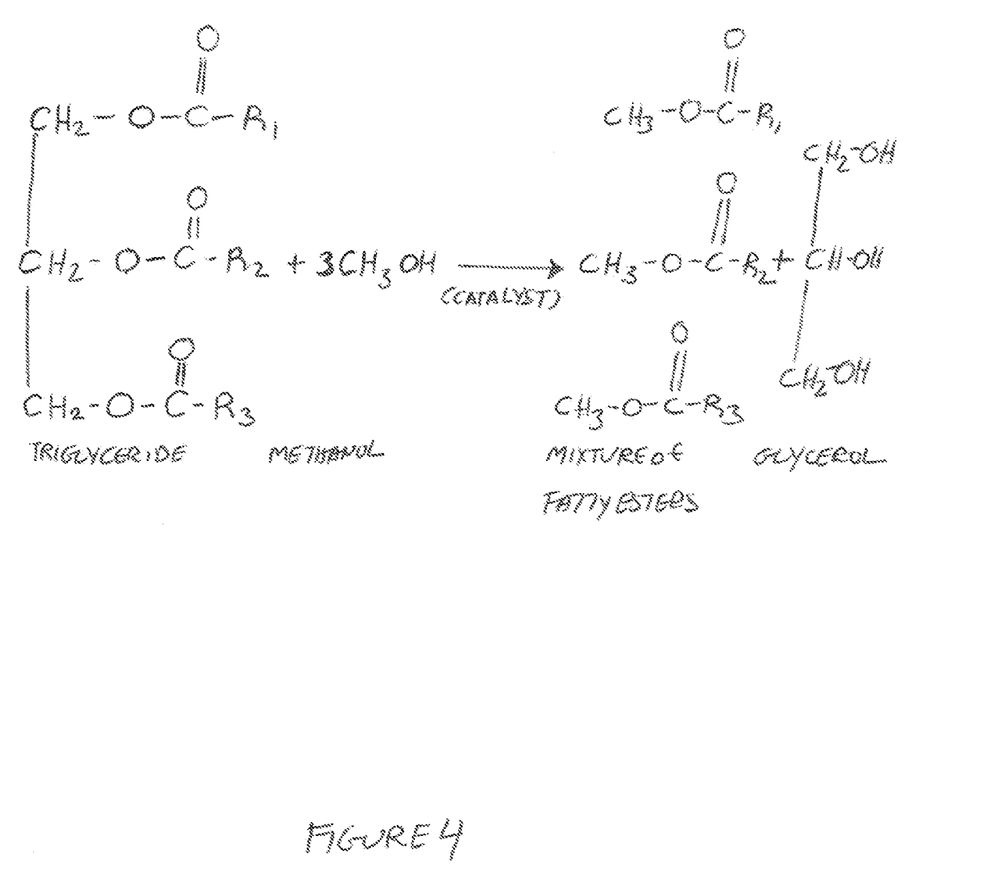
FIG. 4 is substantially a structural formulation of the chemical process for the transesterification process as generally used in the present invention.

As substantially shown in FIG. 4, step 104 transesterification, as generally set forth above, this portion of the process may include the preparation steps as known by those with ordinary skill in the art for the formation of biodiesel (e.g., saponification and subsequent removal of free fatty acids in the feed stock; removal of excess water, general contaminate removal or amelioration; and the like). The prepared feed stock may then placed into a generally enclosed chamber or the like where the triglyceride feedstock is substantially reacted with a base catalyst (e.g., such as an organic salt or alkoxide like potassium or sodium methylate) and alcohol (e.g., methanol) to generally form a mixture substantially comprised of glycerol portion and a biodiesel portion generally made up of various FAME compounds. The mixture can subsequently be subject to various techniques and equipment to substantially provide either both batch and high volume separation of the Biodiesel (FAME) portion from the glycerine/glycerol portion. Commercial/large scale processing equipment for implementing this stage is available from Green Fuels Ltd. of the United Kingdom. Upon the completion of this step, the process 100 could substantially proceed to step 106, FAME purification.

In step 106, FAME purification, various processes and apparatuses can be applied to the separate biodiesel (FAME) portion to generally remove unwanted byproducts, soap, glycerin, excess alcohol, and trace amounts of water that occurred in the transesterification process.

It should be noted that in at least one possible alternative embodiment of the process that steps 102, 104, and 106 could be bypassed, with the procurement of commercially available biodiesel meeting ASTM D6751 standard (e.g., commercial grade biodiesel). The limitation to such an embodiment could be the probable inability of the operator to procure a commercial grade biodiesel made from a specific feedstock or feedstock combination designed to maximize the output of the invention process to obtain in desired yields the desired FAME fractions to meet the needed quantities as fuel base and/or additive for the invention 10.

Figure 11:
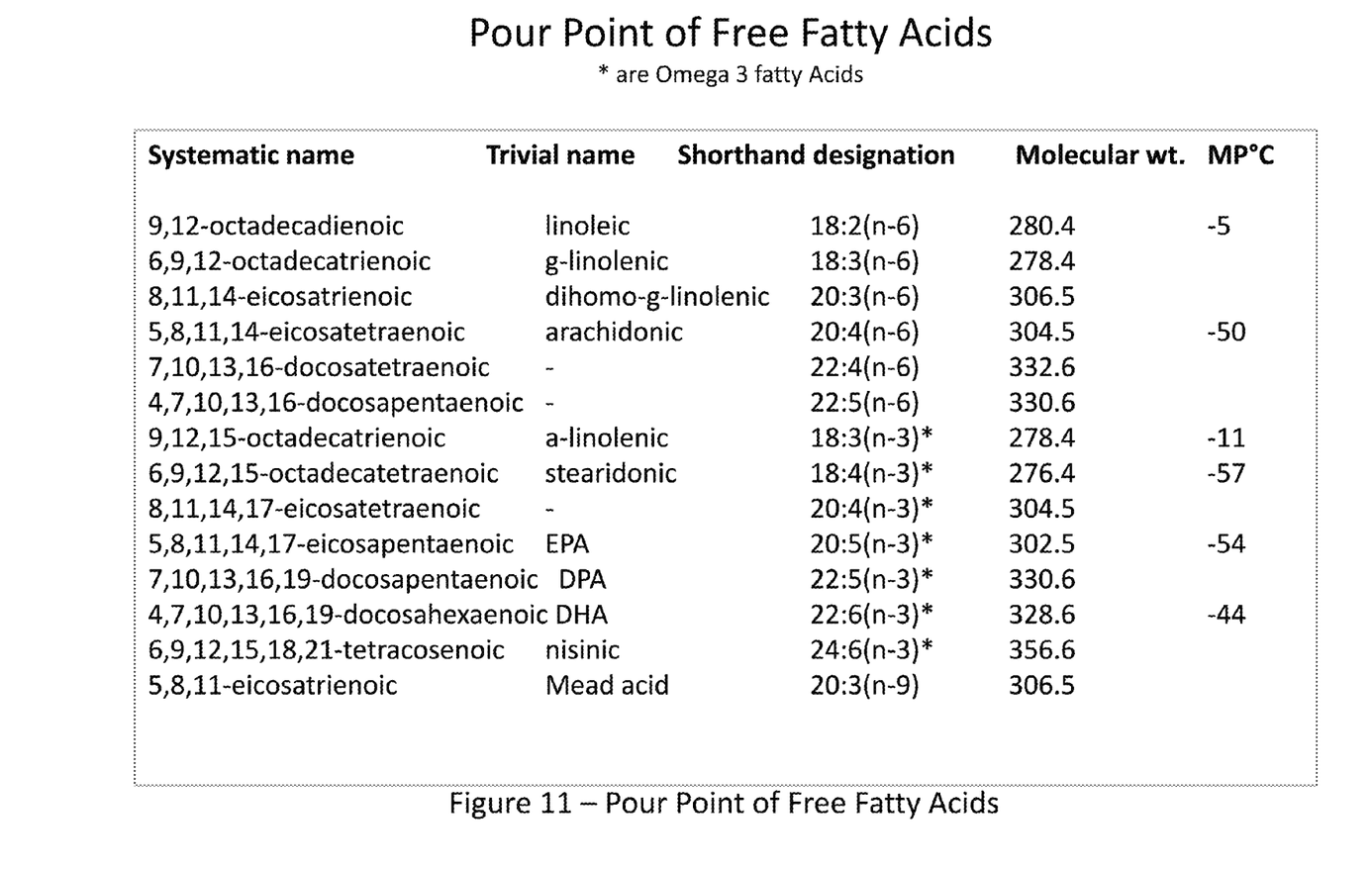
FIG. 11 is substantially a chart showing the Pour Point of some Free Fatty Acids used to determine the temperature to separate FAME fractions.

After the completion of step 106, the process 100 could proceed to step 108, first crystallization-separation. The specifically created biodiesel (using feedstock specifically selected to provide significant quantities of certain FAME fractions of FAME at the expense of other FAME fractions) will crystallize various FAME fractions at various temperatures proximate to or below freezing based on physical properties imbued by the length of the hydrocarbon chain of the particular FAME fraction. This phenomenon substantially allows for separation of various FAME fractions constituting a specific feed stock based biodiesel. For example, Omega 3 (e.g., the highly polyunsaturated) FAME would crystallize at −11° C. while Omega 6 FAME, Omega 9 FAME, and Saturated FAMEs will crystallize at −5° C., 0° C., and 5° C. respectively. FIG. 11 further shows the Pour Points (or crystallization points) of various Free Fatty Acids.

Figure 5:
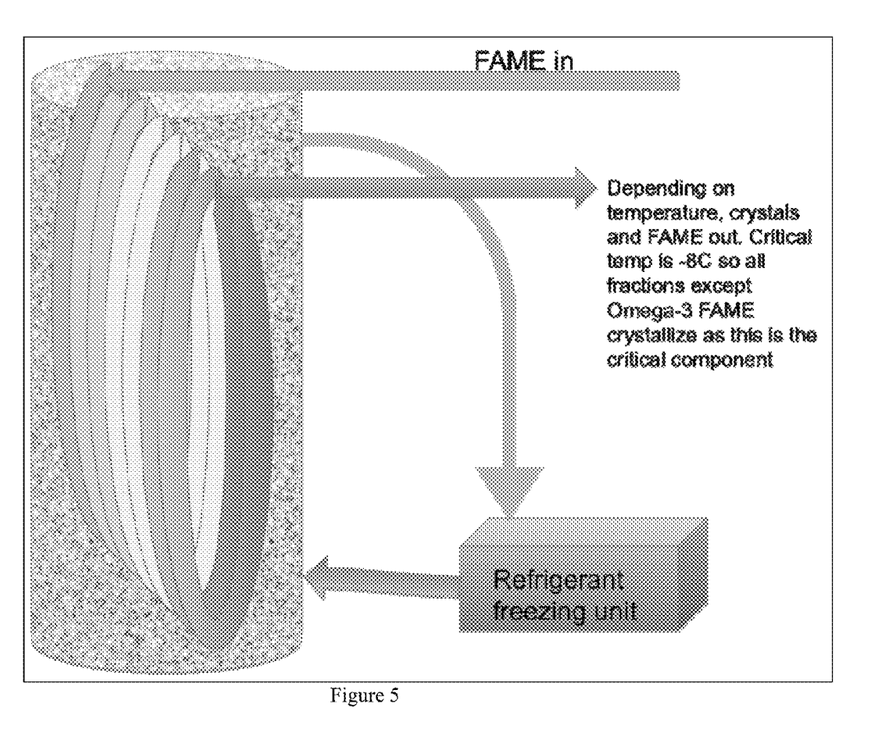
FIG. 5 is substantially a schematic showing a processing of crystallization and separation step of the invention.

As substantially shown in FIG. 5, the crystallization separation step could be a two-phase process involving a crystallization phase/apparatus and a separation phase/apparatus. In the first phase of crystallization, the apparatus could involve a refrigeration/freezing unit and heat exchanger having the ability to drop the flow of FAME moving through the unit down to minus 8° C. At this temperature, the Omega 6 FAME, Omega 9 FAME, and saturated FAME should crystallize while leaving the Omega 3 as a liquid. At this point, the mixture of the crystallized fractions of FAME (together) and the liquid Omega 3 FAME fraction could have significantly different and distinguishable characteristics (e.g., different respective densities allowing for a density gradient separation, different sizes for filtration-based separation) At this point, the second phase of separation can provide for the refrigerated biodiesel to be processed through centrifuge, membrane filters, or other suitable separation means to separate and remove the liquid fraction from the crystallized fractions based on density differentiation. The separation and removal of the liquid phase Omega 3 FAME component from the remaining crystallized fractions of biodiesel could result in the Omega 3 FAME fraction having 85-90 percent purity. It is estimated by the inventor that using a Camelina feedstock-based biodiesel for optimized production of Omega 3 FAME, that approximately 33% of the original biodiesel FAME by volume could be extracted as a high purity Omega 3 FAME fraction. Once the liquid Omega 3 FAME fraction is substantially removed from the remainder crystallized FAME fractions, the last part of the separation phase could be warming (through appropriate heating means) the remainder crystallized FAME fractions to return them to a liquid phase. The value of a high purity fraction of Omega 3 FAME could bring many times their market value than if just sold as a biodiesel fuel. These non-biodiesel markets could include the nutrition and cosmetics markets.

Figure 6:
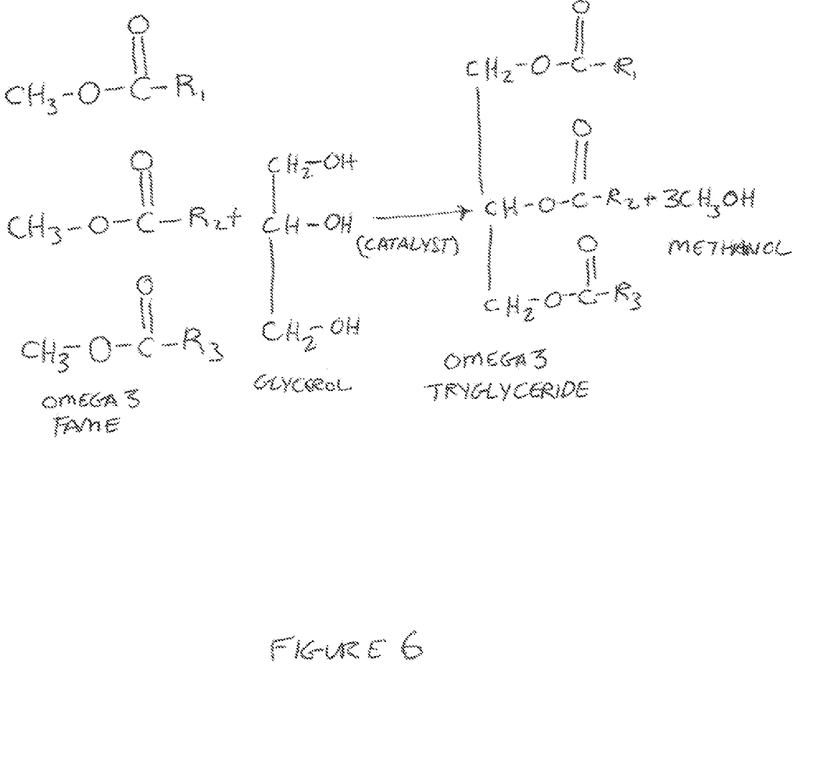
FIG. 6 is substantially a structural formulation of the chemical process for the glycerolysis process.

As substantially shown in FIG. 6, the Omega 3 FAME can be converted back into an Omega 3 triglyceride in process 109 called glycerolysis. Stated simply, this is the reverse process to transesterification, where the alcohol molecule is generally removed from the Omega 3 FAME. In many cases, this is the form of Omega 3 that the nutrition and cosmetics market want to purchase. The glycerolysis reaction may use Omega 3 FAME and crude glycerol as inputs to generally yield Omega 3 triglyceride and alcohol.

It should be understood that the removal of the Omega 3 FAME from the remaining fractions of biodiesel at step 108 could increase the oxidative stability of remaining biodiesel/FAME fractions when used as a fuel. Once step 108 is substantially completed, the process 200 could proceed to step 110, $2^{nd}$ crystallization-separation of those remaining Omega 6, Omega 9, & Saturated FAME fractions.

In this step 110, the $2^{nd}$ crystallization-separation, the remainder biodiesel FAME fractions of the $1^{st}$ processed through this crystallization-separation step utilizing wherein the remainder fraction is generally chilled to 5° C. to crystallize the saturated FAME fraction, leaving the Omega 6 FAME and Omega 9 FAME fractions substantially in a liquid phase. The remainder biodiesel can then be moved through the separation phase to separate out the crystallized saturated FAME fraction from the combined Omega 6 and Omega 9 FAME fraction in liquid phase. The inventor generally estimates that if the Camelina oil-based biodiesel is used, the separated saturated FAME substantially represents about 12% of the original biodiesel by volume while the separated Omega 6 and 9 FAME fractions could respectively represent approximately 36% and 19% of the original biodiesel by volume. The remaining Omega 6 and 9 FAME fractions could be run through a heating means to return them from a crystallized state to a liquid state.

Once step 110 has been completed, the process 100 could move onto step 112, hydrogenation.

Figure 7:
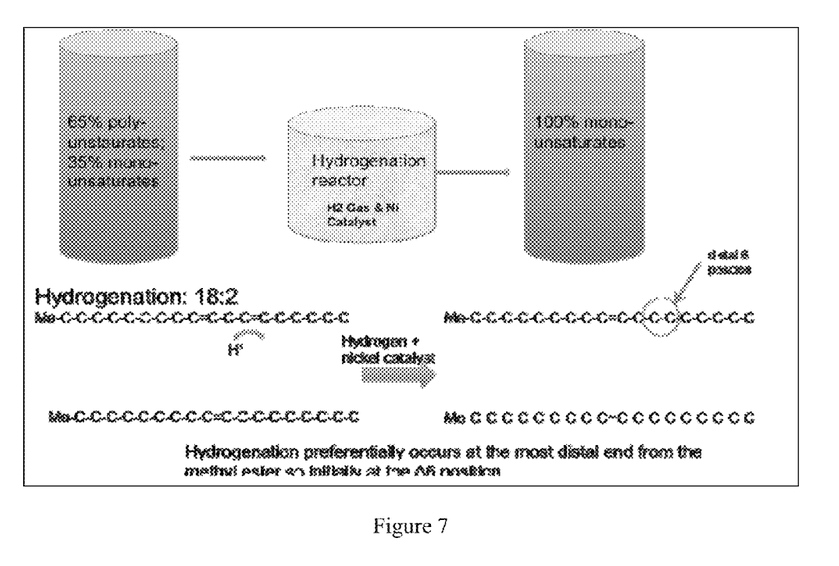
FIG. 7 is substantially a schematic showing the hydrogenation step of the invention.

As substantially shown in FIG. 7, step 110 could have the combination containing Omega 6 and Omega 9 FAMEs that could be subject to a hydrogenation process as known by those skilled in the art. At this point, if Camelina was the original feedstock for the biodiesel, the Omega 6 FAME fraction could represents 65% of the remaining mixture by volume, the balance generally being Omega 9 FAME fraction. In this step, the remaining FAME fractions mixture may be sent or sprayed into a reactor, which may contain a hydrogen gas atmosphere (at 2-3 atmospheric pressure), heated to 100° C. temperature, and a solid nickel catalyst. The hydrogenation reaction may generally occur first at a distal unsaturated point (e.g., at the six [6]carbon double bond, converting it to single bond) away from the carboxyl group, creating a preferential conversion of Omega 6 FAME (C18:2n6) to Omega 9 FAME (C18:1n9), this conversion substantially occurring prior to any conversion of Omega 9 FAME (C18:1) to a saturated FAME (C18). It should be noted that the operator, if so desirous, could control the hydrogenation to allow it to generally continue and further convert the double bond at the 9 position of both FAME fractions to a single bond so that both FAME fractions are then converted to fully saturated (i.e., no double bonds) FAME, if such a FAME fraction was desired. In this manner, the duration of hydrogenation can be seen as varying the overall FAME composition of the remaining fractions as desired by the operator.)

The C18:2n6 FAME with its two (2) double bonds initially, after hydrogenation, may now only one double bond at the nine (9) carbon position at the center of the carbon chain and being converted into an Omega 9 FAME. The original amount of Omega 9 FAME fraction could be increased by the volume of the converted Omega 6 FAME fraction. As controlled, the hydrogenation process could have no effect on the final Omega 9 FAME fraction (after hydrogenation is completed, the only FAME remaining should only be Omega 9 FAME.) After the substantial completion of Step 112, the process 100 could further continue to step 114, hydrolysis.

Figure 8:
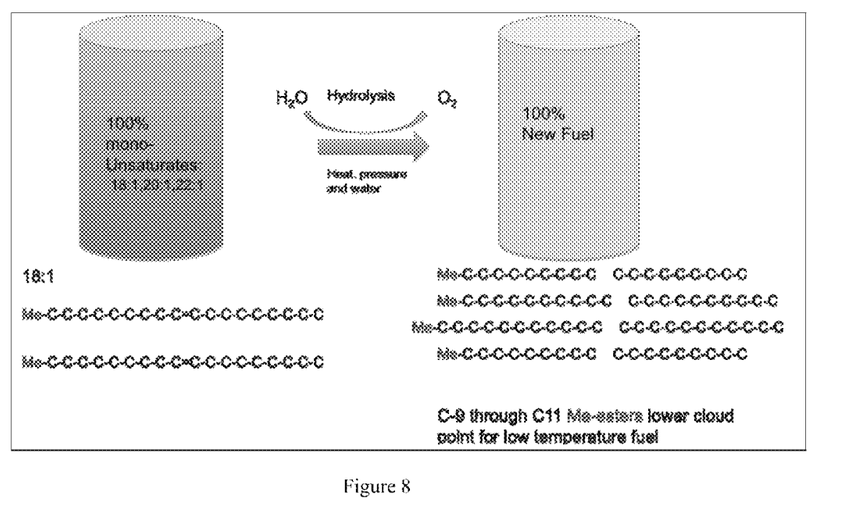
FIG. 8 is substantially a schematic showing the hydrolysis step of the invention.

As substantially shown in FIG. 8, step 114 hydrolysis could have the resultant Omega 9 FAME fraction transferred to a hydrolysis reactor and mixed with water, the combined water—Omega 9 FAME mixture is subject to five (5) atmospheres of pressure and to temperatures generally at 120° C. for a period of 24 hours to fracture its carbon chain at the unsaturated number nine (9) position double bond of the Omega 9 FAME. This fraction's hydrocarbon chain could fracture at the unsaturated site into two fragments: an oxygenated nine-carbon fragment with the attached methyl ester group and a saturated carbon chain making up the balance of the former fatty acid. Chain length of this second carbon polymer could vary depending upon the original FAME molecule. For example, in so reacting a fraction of 18:1 FAME, the resultant mixture could be comprised of nine (9)-carbon hydrocarbon chains having a methyl group at one end (i.e., a methylated 9-carbon chain) and nine (9)-carbon hydrocarbon chains without a methyl group. In another example, the reacting of a fraction of a 20:1 FAME could result (depending on the location of the single double bond) in the generation of a mixture of a methylated ten (10) carbon chains and ten (10) carbon chains. The resultant fraction mixture being ultimately directed by the feedstock used to create the original biodiesel.

With the present example of Camelina feedstock-based biodiesel, the mono-unsaturated Omega 9 FAME fraction when submitted to the hydrolysis step could have at the 9 position double bond. The resultant is a new fuel comprising of C9 through C11 carbon alkyl chains, half of the C9-C11 chains having a Methanol (Me) molecule on the end. See FIG. 9, New Fuel (Item 7). This new fuel may be seen as being compatible to the compositions of Jet A, Jet A1, and JP8 aviation fuels in that they generally have a primary ingredient of "nonane"—a linear alkane hydrocarbon with the chemical formula of $C_9H_2O$ that is principally derived from petroleum but structurally similar to the carbon fragments derived from the invention's process described above. Conventional fuel that is based on nonane is typically classified as kerosene. The hydrolysis process of the invention by cleaving the Omega 9 FAME at the nine carbon double bond position substantially creates a fuel similar in composition to conventional jet fuel with the exception that 50% of the fuel has half its nine carbon chains being oxygenated hydrocarbon (e.g., have a methyl group). This new fuel in comparison to the established jet fuel should have the characteristic of reducing emissions in that more oxygen in the new fuel should lead to cleaner fuel consumption and a reduced cloud point. The new fuel, in containing longer carbon fragments than normally found in the established jet fuels, should be able to restore any energy potential lost in having the oxygenated fragments.

Once step 114 is completed, the process could substantially proceed to step 116, mixing process.

Figure 9:
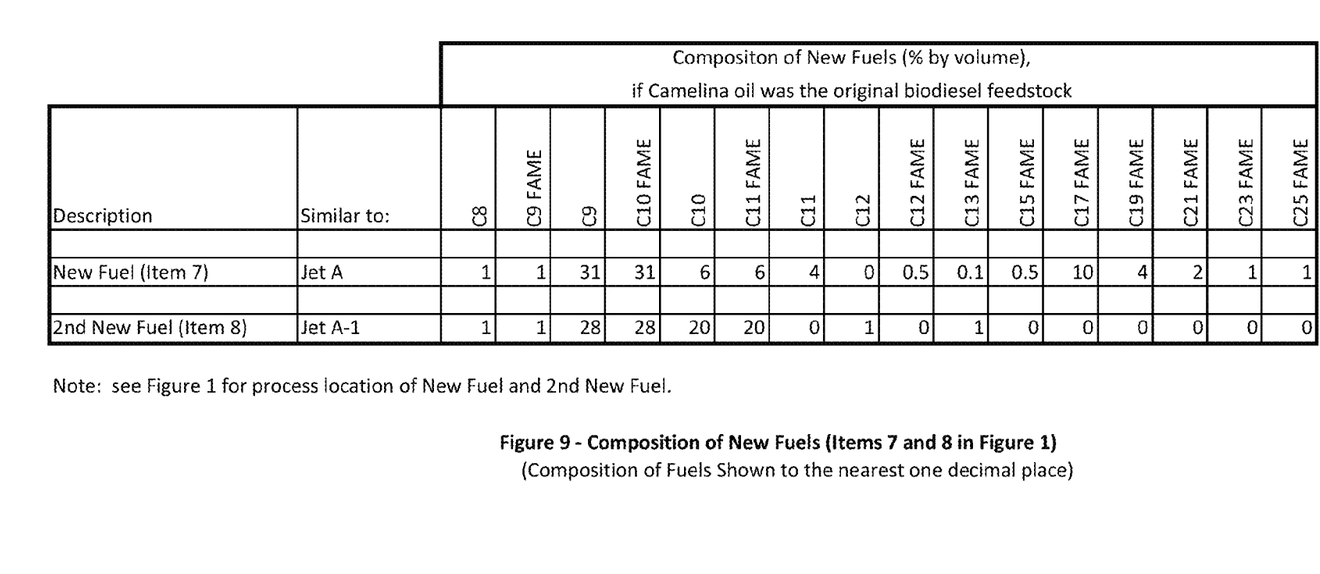
FIG. 9 is substantially a chart showing an embodiment of the invention as a composition of a new fuel.
Figure 10:
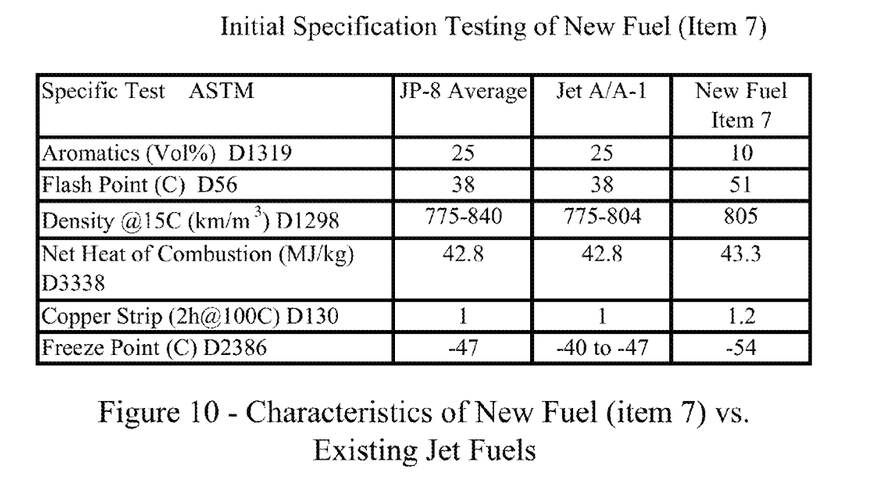
FIG. 10 is substantially a chart comparing the characteristics of new fuel of the invention with those of existing jet fuels.

In step 116, mixing process, the new aviation fuel of the invention obtained in step 114, may be mixed with an additive of the third (saturated) FAME fraction that was originally isolated in step 110. This new mixture may form a new second fuel to contain C9-11, C9-11+Me, and saturated FAME. This new fuel mixture generally represents 67% of the original biodiesel of the Camelina oil feedstock. The composition of the New Fuels (Items 7 and 8) are shown in FIG. 9. FIG. 10 substantially shows the characteristics of New Fuel (Item 7) vs. existing Jet Fuels.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A jet aviation fuel composition comprising C8 NON-FAME ALKANE, C9 FAME, C9 NON-FAME ALKANE, C10 FAME, C10 NON-FAME ALKANE, C11 FAME, C11 NON-FAME ALKANE, and C12 FAME wherein the jet aviation fuel composition has a freeze point of −54° C. and a flash point of 51° C.

2. A jet aviation fuel composition of claim 1 further comprising of C13 FAME, C15 FAME, C17 FAME; C19 FAME; C 21 FAME, C23 FAME; and C25 FAME.

3. A jet aviation fuel composition of claim 2 further comprising percentage by volume of 1% C8 NON-FAME ALKANE, 1% C9 FAME, 31% C9 NON-FAME ALKANE, 31% C10 FAME, 6% C10 NON-FAME ALKANE, 6% C11 FAME, 4% C11 NON-FAME ALKANE, 0.5% C12 FAME, 0.1% C13 FAME, 0.5% C15 FAME, 10% C17 FAME, 4% C19 FAME; 2% C21 FAME, 1% C23 FAME, and 1% C25 FAME.

* * * * *